(12) United States Patent
Sears et al.

(10) Patent No.: US 10,906,143 B2
(45) Date of Patent: Feb. 2, 2021

(54) METHODS AND SYSTEMS FOR THE MANUFACTURE OF CUTTING BLADES FOR INDUSTRIAL MACHINES

(71) Applicant: SSI Shredding Systems, Inc., Wilsonville, OR (US)

(72) Inventors: Todd Sears, Oregon City, OR (US); Thomas Garnier, Portland, OR (US)

(73) Assignee: SSI SHREDDING SYSTEMS, INC., Wilsonville, OR (US)

( * ) Notice: Subject to any disclaimer, the term of this patent is extended or adjusted under 35 U.S.C. 154(b) by 362 days.

(21) Appl. No.: 15/796,376

(22) Filed: Oct. 27, 2017

(65) Prior Publication Data

US 2018/0117596 A1    May 3, 2018

Related U.S. Application Data

(60) Provisional application No. 62/414,008, filed on Oct. 28, 2016.

(51) Int. Cl.
*B02C 18/18* (2006.01)
*B02C 18/14* (2006.01)
(Continued)

(52) U.S. Cl.
CPC .......... *B23P 15/28* (2013.01); *B02C 18/0084* (2013.01); *B02C 18/142* (2013.01); *B02C 18/18* (2013.01); *B02C 18/182* (2013.01)

(58) Field of Classification Search
CPC ............ B02C 18/0084; B02C 18/0092; B02C 18/142; B02C 18/146; B02C 18/18; B02C 18/182; B02C 18/184; B02C 13/06; B02C 13/18; B02C 13/28; B02C 13/2804; B02C 2013/2808; B02C 2013/2812; B23P 15/28; B23P 15/34; B23P 15/40; B23P 25/003; B23K 9/042; B21K 9/00; B21K 11/00
(Continued)

(56) References Cited

U.S. PATENT DOCUMENTS 1,669,088 A * 5/1928 Johnson ................ B02C 18/362
                                                     83/675
3,048,160 A * 8/1962 Griffin ................... B28D 1/121
                                                     125/15
(Continued)

FOREIGN PATENT DOCUMENTS

GB      2026907 A  *  2/1980  .......... B02C 18/182
JP      2010264353 A  *  11/2010
JP      2015199105 A  *  11/2015

OTHER PUBLICATIONS

Machine Translation of JP2015-199105, 7 Pages. (Year: 2015).*
(Continued)

*Primary Examiner* — Gregory D Swiatocha
(74) *Attorney, Agent, or Firm* — McCoy Russell LLP

(57) ABSTRACT

A method for hardfacing cutting blades used in industrial machinery by creating a channel in the surfaces of an oversize cutting blade that may be filled with hardface weld and machining the outer edge of the main body and channel to create a desired finish profile with a hardfaced edge. Such a cutting blade may additionally have fixed points of reference on the cutting blade which may be used to automate some or all of the process of creating and/or hardfacing a cutting blade to the desired profile.

13 Claims, 6 Drawing Sheets

(51) Int. Cl.
*B02C 18/00* (2006.01)
*B23P 15/28* (2006.01)

(58) Field of Classification Search
USPC .................................................. 76/112, 115
See application file for complete search history.

(56) References Cited

U.S. PATENT DOCUMENTS

| | | | | |
|---|---|---|---|---|
| 4,428,260 | A * | 1/1984 | Eby | B23P 15/40 |
| | | | | 172/747 |
| 5,230,151 | A * | 7/1993 | Kunzman | E02F 3/965 |
| | | | | 30/131 |
| 10,160,127 | B2 * | 12/2018 | Dutta | B26B 9/00 |
| 2005/0123365 | A1 * | 6/2005 | Goudemond | B23B 27/141 |
| | | | | 407/113 |

OTHER PUBLICATIONS

Machine Translation of JP2010-264353, 8 Pages. (Year: 2010).*
RS50-100 Four Shaft Shredder for Difficult Applications, Dec. 28, 2015, 5 Pages. (Year: 2015).*

* cited by examiner

METHODS AND SYSTEMS FOR THE MANUFACTURE OF CUTTING BLADES FOR INDUSTRIAL MACHINES

CROSS REFERENCE TO RELATED APPLICATIONS

This application claims priority to U.S. Provisional Application No. 62/414,008, entitled "METHODS AND SYSTEMS FOR THE MANUFACTURE OF CUTTER BLADES FOR SHREDDERS," filed Oct. 28, 2016, the entire contents of which is hereby incorporated by reference in its entirety for all purposes.

BACKGROUND

Industrial shredding machines are used in a wide variety of industries to reduce, process, and recycle new and used materials. Generally, these shredders use overlapping counter rotating cutting blades to reduce the size of the material being processed. While these blades could be manufactured from any suitable metal, for reasons of cost, size, and weight, these cutting blades are generally manufactured from low and/or medium alloy steel. However, low and medium alloy steels have decreased performance/wear resistance attributes in comparison to harder alloys.

In order to improve performance/wear resistance or restore worn-down surfaces of cutting blades, high quality steel may be welded to the edges of the cutting blades (hardfacing). Traditionally, welding harder steel along the perimeter of a cutting blade necessitates machining a bevel on the perimeter of the lower grade alloy and applying hardface weld to the cutting edge.

The weld is applied to the cutting edge in a molten form and allowed to harden before being finished. However, this manner of hardfacing requires an excess of weld be applied to the cutting blade to build up the beveled edge and allow for sufficient hardface to grind to the desired edge profile, wasting expensive material. Further, given the properties of the hardfacing, once it is set it can be difficult and time consuming to finish it to a desired sharpness. Additionally, in order to join the weld and the core material, the cutting blade must be heated for extended periods of time, altering the physical properties of the core material and decreasing the overall lifespan of the blade. There is, therefore, a need for additional means of attaching the desired hardface to the main body of a cutting blade and creating an appropriate edge.

BRIEF SUMMARY

The cutting blades described herein may be manufactured for use in any type of machinery. In some examples, the cutting blades are manufactured for use in industrial and commercial shredding machines. While cutting blades may be of any size, generally industrial and commercial shredding machine cutting blades are between about 5" to about 50" in diameter, about 9" to about 40" in diameter, and about 2" to about 8" in thickness, about 4" in thickness. The cutting blades may be manufactured from any metal or alloy suitable for the desired durability and intended purpose of the blade. Generally, cutting blades are made from a first alloy with a second alloy applied along a first upper or top perimeter and second lower or bottom perimeter of the cutting blade.

As described herein, an oversize cutting blade is cut from a first alloy by any means generally used in order to form the main body of the cutting blade. In some examples, the cutting blade is cut using flame or laser cutting techniques. The cutting blade may be cut in any shape that is useful for its intended purpose. In some examples, the main body may comprise one or more cutting hooks arrayed around the periphery of the central core of the main body.

In one aspect, the main body of the cutting blade may have a central bore. Such a central bore may allow the cutting blade to be mounted on and connected to a plurality of power-driven rotary shaft of a shredding machine. In some examples, the main body of the cutting blade may additionally have a positioning hole to assist in placing the cutting blade on a power-driven rotary shafts in a shredding machine. The main body may further comprise a plurality of tooling holes that have been machined or drilled into the main body in proximity to the central bore. Such tooling holes may be used, in some examples, to automate some or all of the manufacturing processes involved in producing and re-sharpening cutting blades.

Oversize cutting blades comprising a first alloy may have a second or different alloy welded onto the cutting edges. While any second alloy that fills the intended purpose may be used, in some examples, the second alloy may be hardfacing. The hardfacing may be affixed to the main body of the cutting blade using any means generally used, in some examples, prior to applying the hardface, a channel may be cut along the outside edge of the top and/or bottom surface of the oversize cutting blade (proximate to the perimeter of the exterior edge of the oversized cutting blade). In some examples, the channel is continuous and evenly spaced along the perimeter on a top and/or bottom surface of the oversize cutting blade. Such a channel may be a U or C channel, with the bottom of the channel at right angles to the walls of the channel. The channel may be filled with a molten steel of a harder grade alloy than the first alloy used to form the main body of the oversize cutting blade, for example, tool steel. Once cooled, the outer perimeter of the main body is machined off until the exterior wall of the channel containing the hardfacing is removed, exposing layered steel alloys with the harder grade steel on the top and bottom, and a layer of the first alloy (main body) in the middle. Removal of the outer edge of the channel creates a cutting edge angle of hardface with the desired degree of acuteness on a top and or bottom cutting edge. In some embodiments, the shape of the U or C channel may be altered to change the cant of the cutting edge once the perimeter of the main body is machined off. In some examples, removal of the outer perimeter of the main body to expose the hardfacing creates a 90° cutting edge on the top and/or bottom outer edge of the cutting blade. In some examples, once the outer edge of the channel is machined off, a coloration difference between the hardfacing and the main body may be apparent on the outside edge of the finished cutting blade due to the different compositions of the two types of metal.

Such finished cutting blades hay be used in industrial shredding machines comprising a plurality of power driven rotary shafts disposed in parallel, spaced lateral and adjacently in the shredder and supported on a frame for rotation about their respective axes. The finished cutting blades may rotate in opposite directions with one rotating in a clockwise direction and the other rotating in a counterclockwise direction. Such industrial shredding machines may be designed to process one or more types of industrial waste such as, but not limited to, cars, refrigerators, tires, clothing, furniture, electrical devices, and glassware, where the objects may comprise one or more of metals, plastics, concrete, brick, wood, and the like.

To the accomplishment of the foregoing and related ends, certain illustrative aspects of the system are described herein in connection with the following description and the attached drawings. The features, functions and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
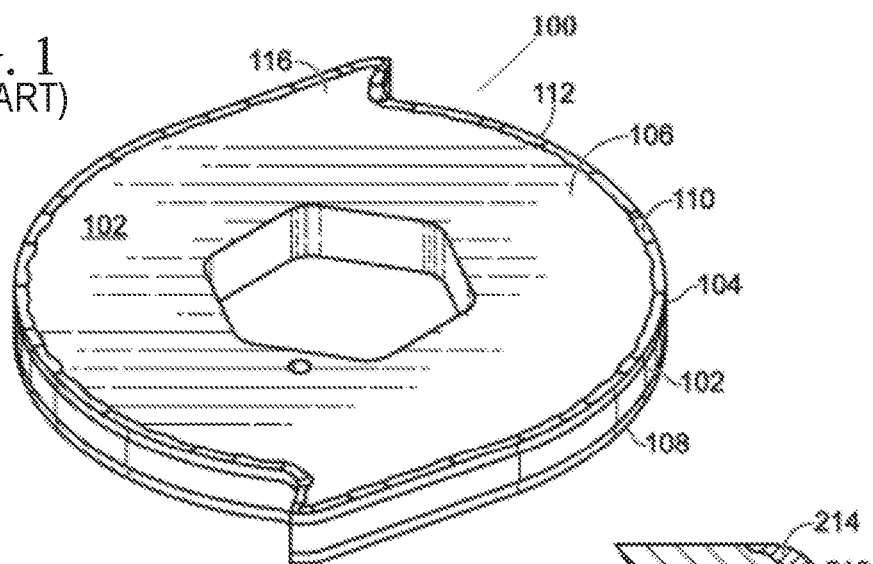
FIG. 1 illustrates an isometric view of a previous example of a cutter blade for an industrial shredder with hand finished hardfacing.

"AISI or SAE 4140 grade alloy steel" in this context refers to low-alloy steel containing chromium and molybdenum as strengthening agents.

"Brinell Hardness (HB) or (HBW)" in this context refers to a designation of hardness performed by pressing a 10 mm spherical tungsten carbide ball against a clean prepared surface using a 3000 Kilogram force, producing an impression. The indentation is measured and hardness calculated as $$HB = \frac{2P}{\pi D\left[D - \sqrt{(D^2 - d^2)}\right]},$$

where P is load, D is steel ball diameter, and d is depression diameter at the rim. (ASTM E10-15a, Standard Test Method for Brinell Hardness of Metallic Materials, ASTM International, West Conshohocken, Pa., 2015).

"Hardfacing" in this context refers to the process in which a layer of surfacing metal is applied to a base metal to reduce wear by increasing the resistance of a metal surface to abrasion, impact, erosion, galling, or cavitation. (American Welding Society, The Practical Reference Guide for Hardfacing).

"Rockwell scale" in this context refers to an empirical indentation hardness test that provides information about metallic materials that correlates to tensile strength, wear resistance, ductility, and other physical characteristics of metallic materials (ASTM E18-16, Standard Test Methods for Rockwell Hardness of Metallic Materials, ASTM International, West Conshohocken, Pa., 2016).

"U channel (sometimes also called a C-channel)" in this context refers to a metal rail where two sides are parallel to each other and are at about a right angle to the bottom of the rail to form a U shape.

Provided herein is a system and means for manufacturing cutting blades. Such cutting blades have a variety of uses including, but not limited to, use in industrial machinery such as shredding machines including shear-type material shredders. These shredding machines may be used in the destruction of confidential materials, recycling, and municipal waste processing, as well as other instances demanding reduction, processing, and recycling of new and used materials. For example, such shredding machines may be used in the shredding of cars, refrigerators, tires, medical waste, metal scrap, electronic scrap, large scale or industrial scale plastics and textile processing, recycling and reclamation, and/or large scale document destruction. Such shredders have cutting chambers (active shredding area) that may range in size from 18"×18" up to 64"×75" or larger. In some examples, such cutting blades may be produced using automated techniques such as robotic welding, referencing a consistent point of reference added to the cutting blade.

A finished cutting blade includes a main body with an outer cutting edge. In some examples, the main body may comprise a central core with a plurality of cutting hooks arrayed around the central core of the main body. The cutting blade may additionally comprise a central bore or central hole in the main body, where the central bore allows for the insertion of the cutting blade on the rotatable shaft of a shredding machine at approximately the center of the cutting blade. The bore may be of any shape suitable for fitting the cutting blade on the rotatable shaft. In some examples it may be hexagonal. In some examples, the main body may additionally include a smaller hole proximate to the central bore which may assist in the placement of the cutting blade in a shredding machine. The main body may further comprise one or more cutting hooks arranged along the perimeter of the main body. In some examples, a plurality of tooling holes may be added adjacent to the central bore. Such tooling holes may function as a fixed point of reference, allowing of the automation of some or all of the manufacturing process of the cutting blades.

Cutting blades may be composed of at least two types of metal alloys with a first alloy of a low or medium grade alloy steel forming the main body of the cutting blade and a second alloy of higher grade tool steel forming the outer cutting edge of the blade. Any suitable alloy may be used to manufacture and hardface the cutting blade. In some examples, the low or medium grade alloy is an abrasion resistant plate. In one aspect, the steel for the main body may have a hardness of about 400 to about 600 HBW, about 450 to about 550 HBW, or any fraction therefore. In additional aspects, the steel alloy for the main body may be AISI 4140 grade alloy steel. The higher grade tool steel forming the cutting edge may be any steel suitable for cutting such as, but not limited to, high speed and other tool steels with a hardness of about 52 to about 67 Rockwell C scale (Rc), about 58 to about 62 Rc, or any fraction thereof. In additional embodiments, the tool steel may have a hardness of about 600 HBW. In one example, wire hardfacing may be used. Such wire hardfacing may have a diameter of about 0.05 inches to about 0.1 inches, about 0.05 to about 0.08 inches, about 0.045 to about 0.08 inches, about 0.045 to about 0.078 inches, about 0.04 to about 0.07 inches, about 0.04 to about 0.05 inches, or any fraction thereof.

In some aspects, the main body of the cutting blades are cut to an oversized profile from a plate of the desired steel alloy. The oversized cutting blades may be about 1/8, 3/16, 1/4, 5/16, 3/8 of an inch or any fraction thereof larger in diameter than the desired profile of the finished blade. In such instances, the finish profile would then be about 1/8, 3/16, 1/4, 5/16, 3/8 of an inch smaller in diameter than the oversized cutting blade, +/−10% or any fraction thereof as measured around the outer circumference of the cutting blade. The cutting blades may be flame cut, milled, laser cut, wire edm cut, plasma cut, or water jet cut from the plate of the desired steel alloy. In some embodiments, a plurality of tooling holes may be added around the central bore of the cutting blade. The tooling holes may be used to provide fixed reference points allowing for automation in the manufacture of new cutting blades and re-honing of used cutting blades.

A channel may be cut in the top and/or the bottom surface of the main body of the oversize cutting blade in a continuous, uninterrupted path along the perimeter of the oversize cutting blade. In some embodiments, the channel is machine cut. The channel may be about 1/8 to about 3/4 of an inch wide, about 1/4 to about 1/2 inch wide, about 2/5 of an inch wide, or any fraction thereof. In additional embodiments, the channel may be about 1/8 to about 3/4 of an inch deep, about 1/5 of an inch deep, about 1/4 to about 1/2 inch deep, or any fraction thereof. The channel may be of any shape useful, in some embodiments, the bottom of the channel may be at about a right angle to the sides of the channel forming a U or C channel. The channel is placed about 1/8, 3/16, 1/4, 5/16, 3/8 of an inch or any fraction thereof from the edge of the oversized cutting blade, wherein the outer side of the channel is at about the desired finished profile of the cutting blade. In some examples, the continuous, uninterrupted channel is evenly spaced from the perimeter of the oversize cutting blade. In some examples, the outer edge of the channel closest may be no more than 1/2 inch from the outer edge of the oversize cutting blade.

The channel on the top and/or bottom surface of the cutting blade is filled with a molten weld of higher grade tool steel. In one aspect, the outer wall of the channel may act as a heat sink, preventing the first alloy from engaging in excessive annealing or softening and assisting in maintaining the integrity of the first alloy. After cooling, the exterior edge of the oversize cutting blade is then machined until the outer edge of the channel is removed, leaving a sharpened cutting edge of the harder steel alloy of about 90°, along the perimeter of the exterior edge of the main body, reducing the oversize cutting blade to the desired finish profile and providing it with a hardfaced edge of the desired shape. The molten weld may partially melt the channel of the main body, binding the two alloys together. In some examples, the fusion of the two alloys creates a variance in the appearance of the machined exterior edge of the finished cutting blade where the main body has bound to the hardface. While the Figures show the join between the two alloys as a straight line, such joins may have a variance between about $1/32^{nd}$ to about $1/4^{th}$ of an inch, but no more than $1/3^{rd}$ of an inch such that the appearance may differ from a thin straight line such as the thin straight lines shown at the joins of the two alloys in, for example, FIG. 5B. In some examples it may be less than $1/8^{th}$ of an inch.

FIGS. 4-6 and 8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

As shown in FIG. 1, a previous example of a cutting blade 100 has a main body 102 with a first plurality of cutting hooks 116. In one example, the cutting hooks 116 are arranged directly opposite one another along a circumference of the cutting blade 100. Weld 112 has been hardfaced along a first or top exterior edge 104 of a top surface 106 of the main body 102 and along a second or bottom exterior edge 108 of a bottom surface (not shown). As seen in FIG. 1, there is excess weld 110 on the top surface 106 or similar excess weld on the bottom surface which has not been ground to a smooth finish. The hand finished edges along the first or top exterior edge 104 and second or bottom exterior edge 108 of the blade of FIG. 1 show irregularities.

Said another way, the weld on the first or top exterior edge 104 or the second or bottom exterior edge 108 does not form an edge of a consistent angle or sharpness, but is rough and/or jagged. As such, the excess weld 110 and its equivalent on the bottom edge may not be smooth and/or flush, resulting in the weld being oblique to, but not normal to, the top exterior edge 104 and second or bottom exterior edge 108. In this way, the cutting blade 100 may comprise a lesser propensity to cut than a cutting blade having a smooth outer edge normal to its top and bottom surfaces, such as the cutting blade illustrated in FIG. 6. Further, the irregularities in the excess weld 110 will increase the friction and wear and tear on the cutting blade, decreasing its overall lifespan.

Figure 3:
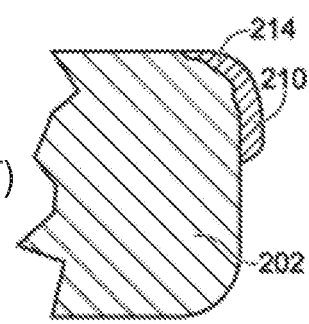
FIG. 3 illustrates a sectional view of the previous example of the cutting blade of FIG. 2.
Figure 2:
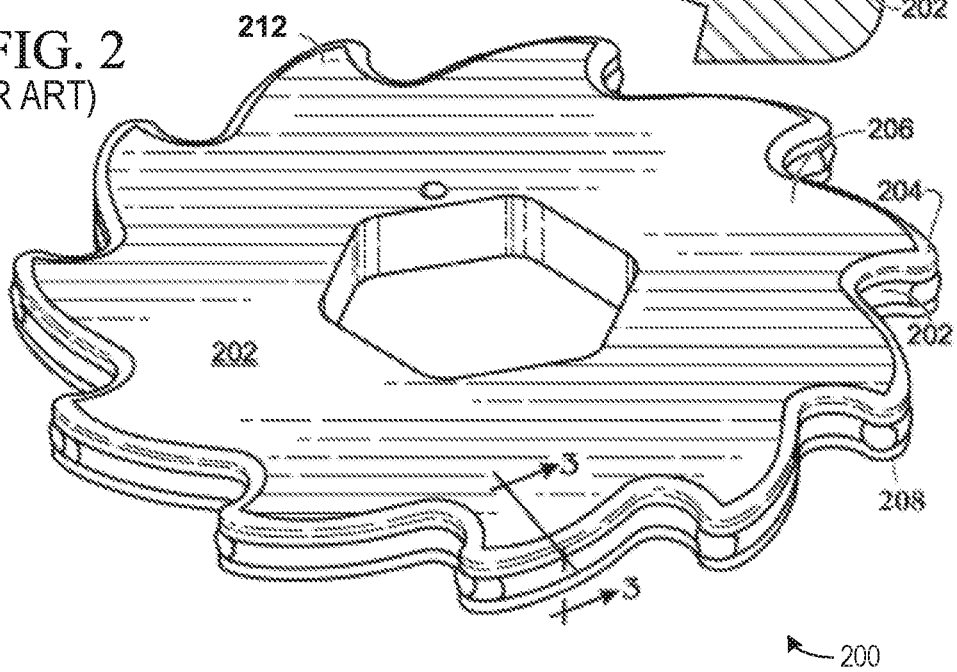
FIG. 2 illustrates a previous example of a cutting blade for an industrial shredder in which hardfacing has been applied to a beveled edge along the perimeter of the cutting blade.

Turning now to FIG. 2 and cross-section FIG. 3, which show previous examples of a cutting blade 200, which may be used similarly to cutting blade 100 of FIG. 1. The main body 202 has a second plurality of cutting hooks 212. Excess weld 210 has been applied to a beveled edge 214 along the first exterior edge 204 of the top surface 206 of the main body and to the beveled edge (not shown) of the bottom surface (not shown) along a second perimeter 208. The excess weld is machined off by hand to create cutting edges along the first exterior edge 204 and the second perimeter 208 similar to the profile of a finished blade shown in FIG. 1. As shown in FIG. 3, a significant amount of excess weld 210 is required to raise the profile of the beveled edge to the correct height. Further, as shown in FIG. 3, the excess weld 210 forms an obtuse angle, as it is difficult to grind the excess weld into the desired shape.

Thus, the previous examples of cutting blades, as shown in FIGS. 1-3, illustrate the cutting blades having an irregular outer edge (e.g., excess weld 110 of FIG. 1 or excess weld 210 of FIG. 3) at an angle greater than 90°. By having a non-uniform obtuse outer edge, the surface area with which the cutting blade may contact a material to be cut may be decreased relative to a flat, uniform outer edge. Further, the edge will be of decreased sharpness relative to an edge of 90° or less. As such, cutting may be unsatisfactory and more force may be required to shred the desired materials. Furthermore, the non-uniformity of the outer edge may lead to uneven wear of the cutting blade, resulting in more frequent and cumbersome re-sharpening processes.

Figure 4:
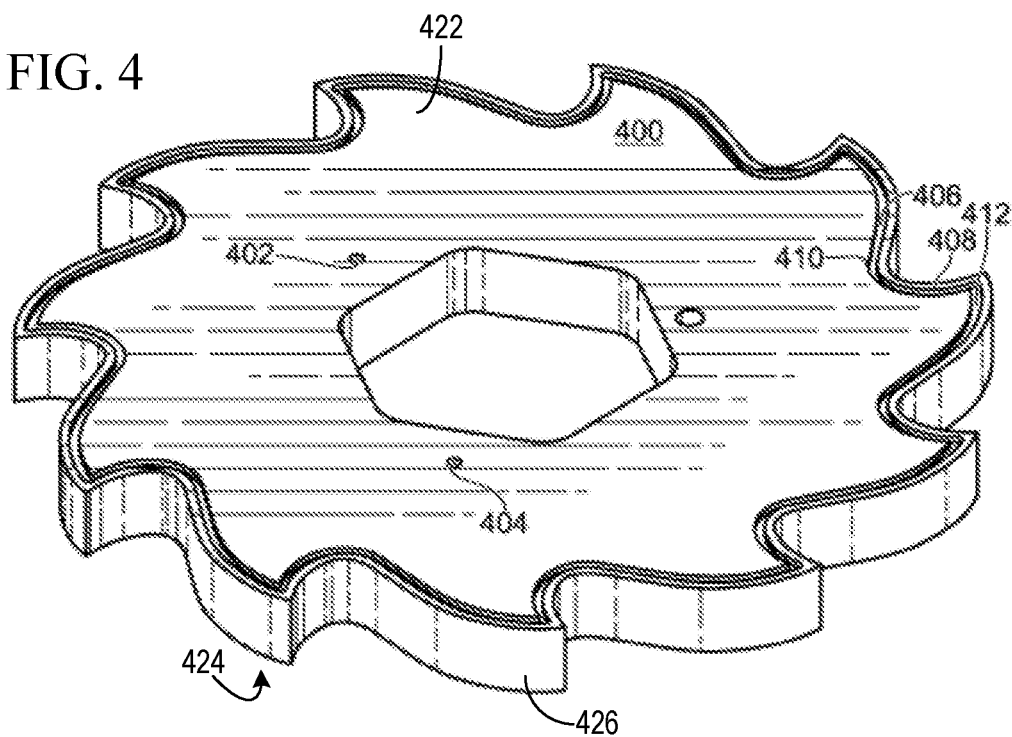
FIG. 4 illustrates an isometric view of the main body of an oversize cutting blade into which a channel has been machined evenly spaced and proximate to the perimeter of the oversize cutting blade.

Turning now to FIG. 4, an example of an oversized cutting blade that can be finished to overcome the shortcomings described above with reference to the previous example of FIGS. 1-3 is depicted. The cutting blade initially has an oversize main body 400 of a first alloy having a central bore 430 and tooling holes 402 and 404 that have been drilled or machined through the entire thickness of the main body. Such tooling holes create a fixed point of reference in the main body 400 that is not affected by machining the edge of the cutting blade, wear on the cutting blade, or other impacts on the hardfacing of the cutting blade. These fixed points of reference may be used to increase the efficiency of producing and re-sharpening cutting blades by providing a fixed reference point that is not affected by changes to the exterior edge of the cutting blade during or after manufacturing. The central bore 430 allows the finished cutting blade to be mounted on a rotary shaft in a shredding machine. The oversize main body 400 additionally comprises a channel 406 proximate to the exterior perimeter of a top surface 422 of the main body. Such a channel 406 may be of any shape useful. Additionally or alternatively, the channel 406 may be shaped similarly to a desired final outline of the cutting blade. In the example of FIG. 4, the final shape of the cutting blade comprises a main body with a plurality of substantially triangular shaped teeth and the channel follows this pattern.

In some embodiments, a first side of the channel 408 and a second side of the channel 410 may be at right angles to the bottom of the channel 412 forming a U or C channel. While a channel is only shown on a first or top surface in FIG. 4, a similar and/or identical channel may be machined into a second or bottom surface (not shown), at a similar and/or identical distance from the outer perimeter, where the bottom surface is on an opposite surface of the oversize main body 400 from the top surface shown. The channel may be located within about 1/8, 3/16, 1/4, 5/16, 3/8 of an inch or any fraction thereof from the outer edge of the oversize main body 400, i.e. the outer edge of the channel is 1/8$^{th}$ of an inch from the outer edge of the main body. In some examples, the channel is no more than 1/2 inch from the outer edge of the oversize main body 400. In some embodiments, the oversize main body is created to be about 1/8, 3/16, 1/4, 5/16, 3/8 of an inch or any fraction thereof larger than the desired profile of the finished blade.

Specifically, the main body 400 further comprises a bottom surface 424, which is obfuscated in the current depiction by the top surface 422. The bottom surface 424 may also comprise a channel substantially symmetrical to the channel 406. In one example, the channel of the bottom surface 424 is identical to the channel 406 of the top surface 422 and is the same distance from the perimeter of the oversized cutting blade. In one example, the channel 406 of the top surface 422 and the channel of the bottom surface 424 are contiguous and uninterrupted. The channels may be spaced away from an outer edge 426 of the main body 400. In one example, the channels are equidistantly spaced away from the outer edge 426 of the main body for the entire perimeter of the outer edge 426. In this way, the outer edge 426, which may be machined down as shown in FIG. 5B, may be machined down such that distances measured between the outer edge 426 and the center of the main body are consistent.

Figure 5A:
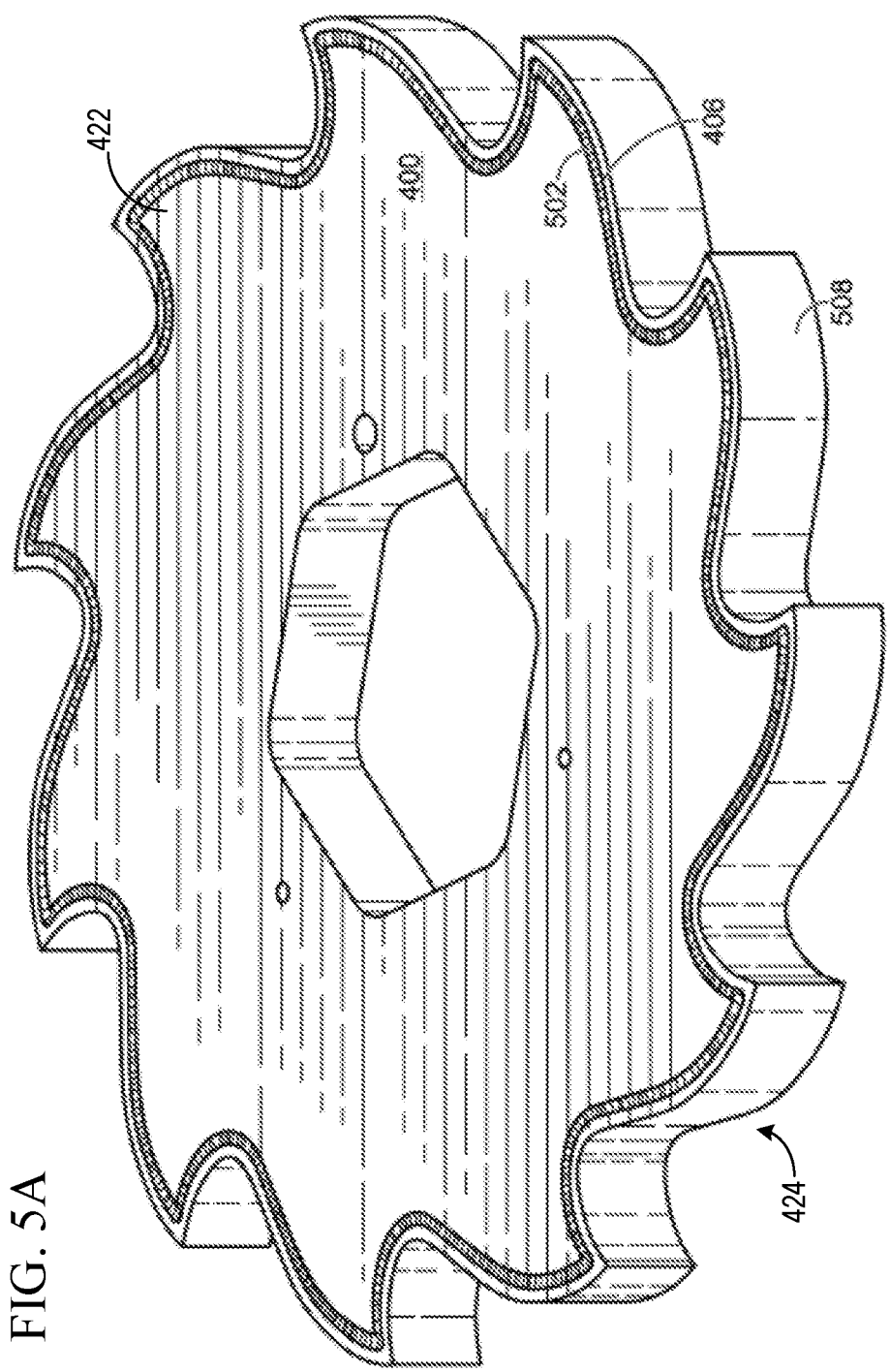
FIG. 5A illustrates an isometric view of the main body of an oversize cutting blade in which a channel proximate to the perimeter of the cutting blade has been filled with steel weld.

In order to hardface the main body 400, molten weld 502 may be added to the channel 406 of the top surface 422 until the channel 406 is filled as shown in FIG. 5A. In some embodiments, welding voltage is used to control the shape of the weld bead. The molten weld is allowed to cool and the process is repeated on the bottom side (not shown). The exterior 508 is then machined to remove the first side of the channel 408, leaving a hardfaced cutting edge of about 90° or smaller. In some examples, this cutting edge is relatively even with minimal variations or irregularities. The cutting edge may thus cut more efficiently than the uneven, less angularly shaped weld of the previous examples due to a sharper edge being in contact with the material to be cut. The molten weld 502 may be additionally added to the channel of the bottom surface 424 (not shown).

Figure 5B:
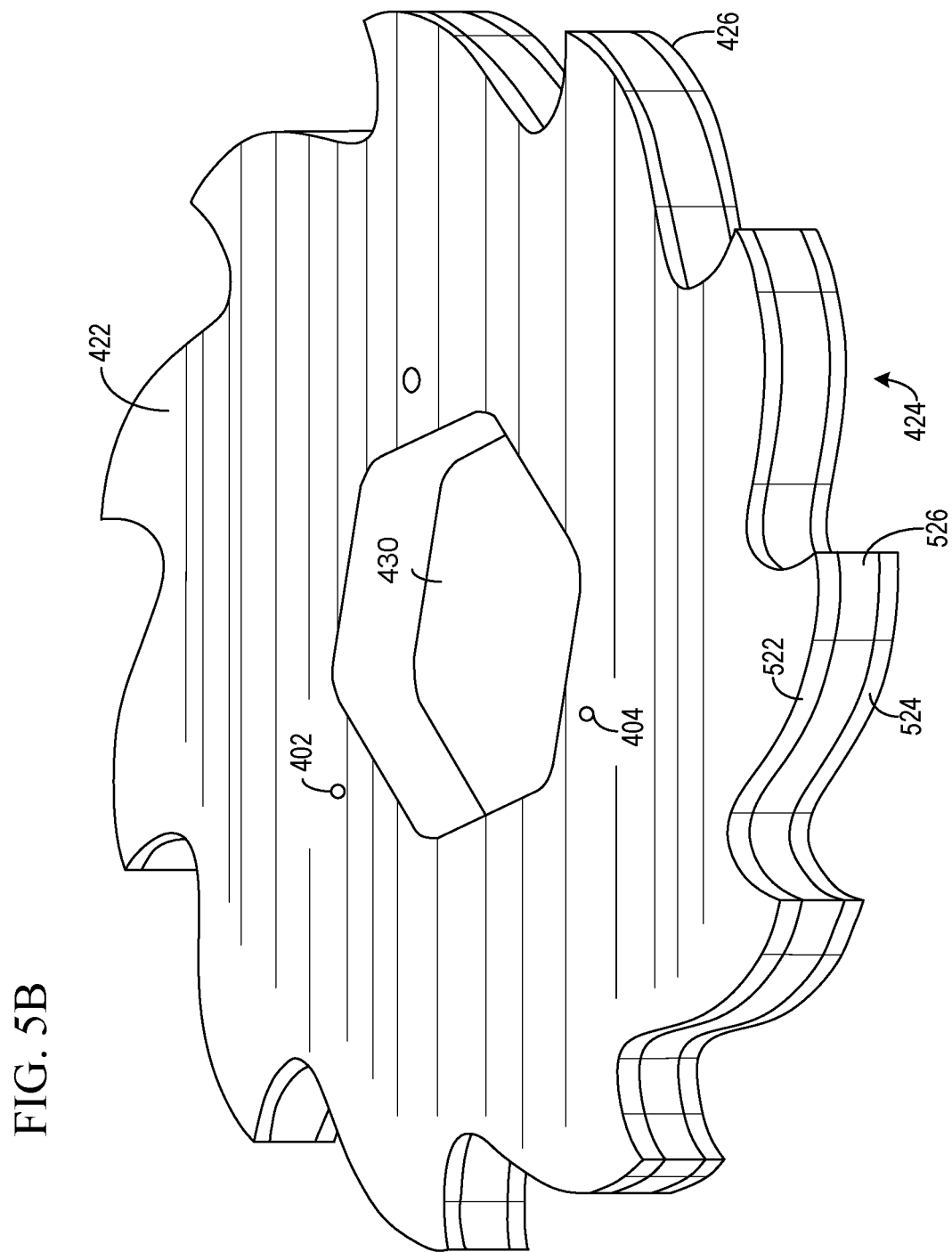
FIG. 5B illustrates an isometric view of the main body of the oversize cutting blade in which the channel has been removed to achieve a first embodiment of a finished cutting blade in which the exterior edge has been machined to a finished profile.
Figure 7:
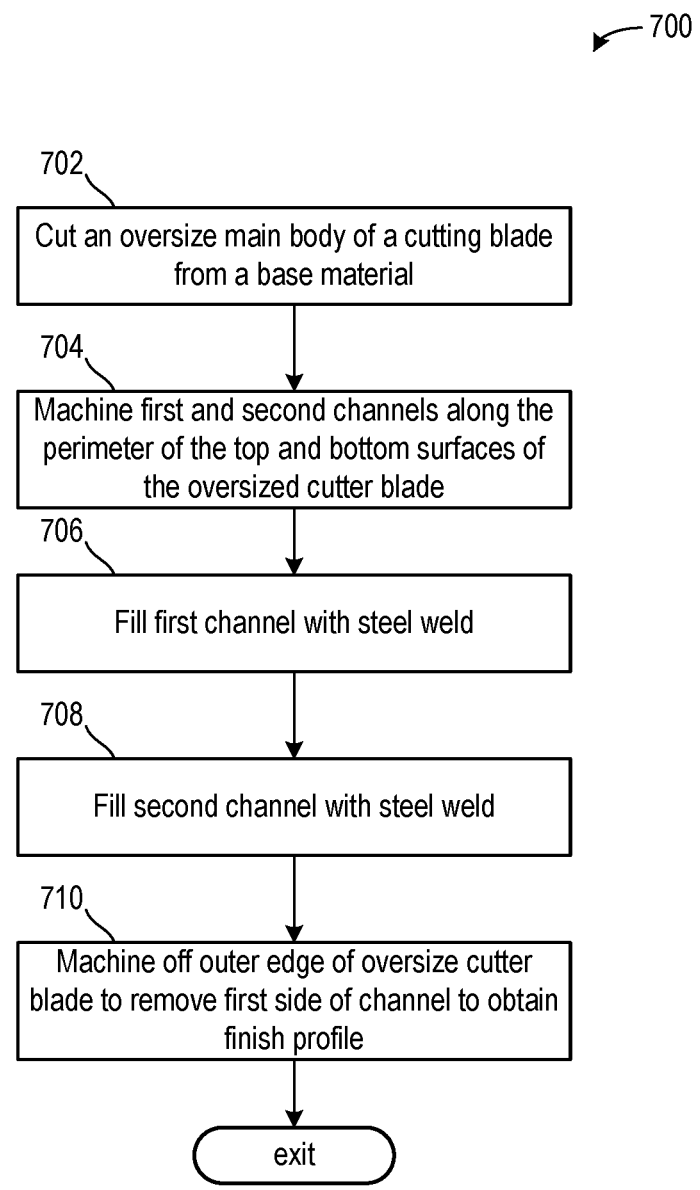
FIG. 7 illustrates a routine in accordance with one embodiment.

Turning now to FIG. 5B, it shows a final product of the cutting blade of FIG. 5A (finished profile). As shown, the outer edge 426 is machined down and the exterior edge of channel 406 of the top surface 422 and the exterior edge of the channel of the bottom surface 424 are removed creating a sharp edge of hardface on the top and bottom edges of the cutting blade.

In one example, the cutting blade of FIG. 5B may be suitable for cutting objects fed to a shredder, such as the objects described below in the description of FIG. 8. A first hardfaced edge 522 is exposed near the top surface 422. A second hardfaced edge 524 is exposed near the bottom surface 424. Arranged between the first and second hardfaced edges 522, 524 is a main body 526 of the cutting blade. In one example, the main body 526 comprises an alloy different than an alloy of the first and second hardfaced edges 522, 524. For example, the alloy of the main body 526 may be softer than the alloy of the first and second hardfaced edges 522, 524.

Figure 6:
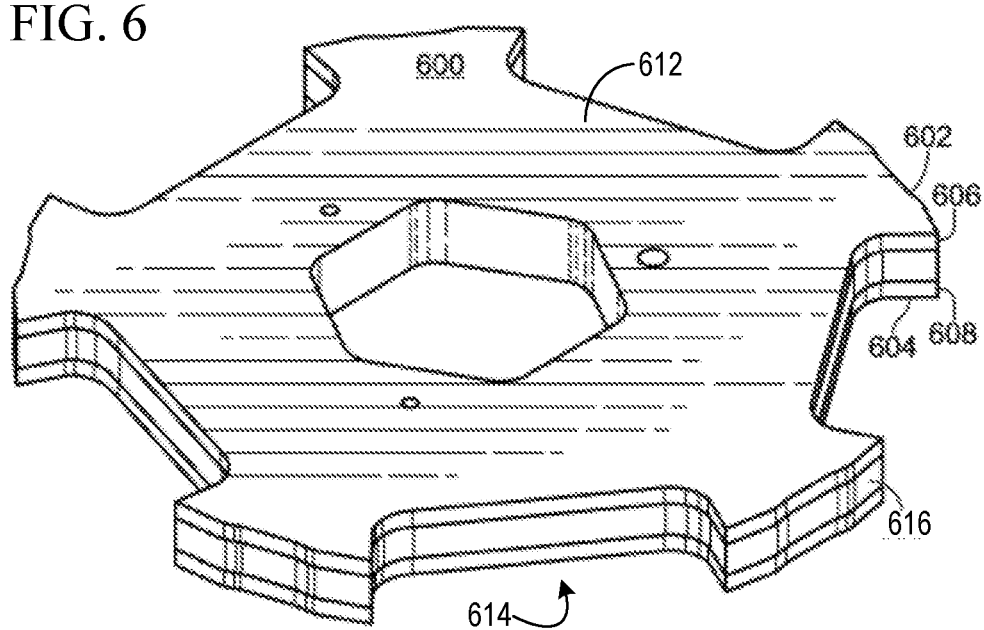
FIG. 6 illustrates an isometric view of a second embodiment of a finished cutting blade in which the exterior edge has been machined to a finished profile.

A second example of a final cutting blade is shown in FIG. 6, where a cutting edge 602 and 604 of the metal used to hardface the main body is exposed on the perimeter of the top 612 and bottom 614 of the main body 600. As shown in FIG. 6, the two layers 606 and 608 of the alloy used to hardface the main body produce a sandwich type appearance with the exterior of the main body shown at 616. As the hardfacing is applied in a molten form and the main body is heated to allow the hardfacing to fuse to the main body, there may be some variance at the point of connection of the hardfacing with the main body such that the appearance of the joins between the layers is not as uniform as shown in FIGS. 5B and 6. Such variance is between $1/32^{nd}$ to $1/4^{th}$ of an inch and no more than about $1/3^{rd}$ of an inch. In some examples, it may be about $1/8^{th}$ of an inch. In further examples, it may be $1/16^{th}$ of an inch.

As shown, the exterior edge 616 is flush and uniform. However, the exterior edge 616 may comprise one or more delineations or the like, while maintaining an overall smooth profile. Said another way, the exterior edge 616 may be perpendicular to the top 612 and bottom 614 surfaces. As such, exterior edge 616 does not extend beyond an outer profile of the top 612 and bottom 614 surfaces.

The cutting blades described herein may be manufactured according to any process designed to create the desired channel and cutting edge. In some embodiments, they may be manufactured according to the process outlined in routine 700. As shown in routine 700, an oversize main body of a cutting blade is cut from a base material (first alloy) at 702. A first channel is machined proximate to the perimeter of the top of the cutting blade and a second channel is machined proximate to the perimeter of the bottom of the cutting blade at 704 (first and second channel). Each channel is then filled with molten tool steel weld at 706 and 708 with cooling permitted between each application of molten steel weld. The perimeter of the oversized main body is machined off until the outer edge of the channel is removed, to create the desired finish profile of the cutting blade.

Figure 8:
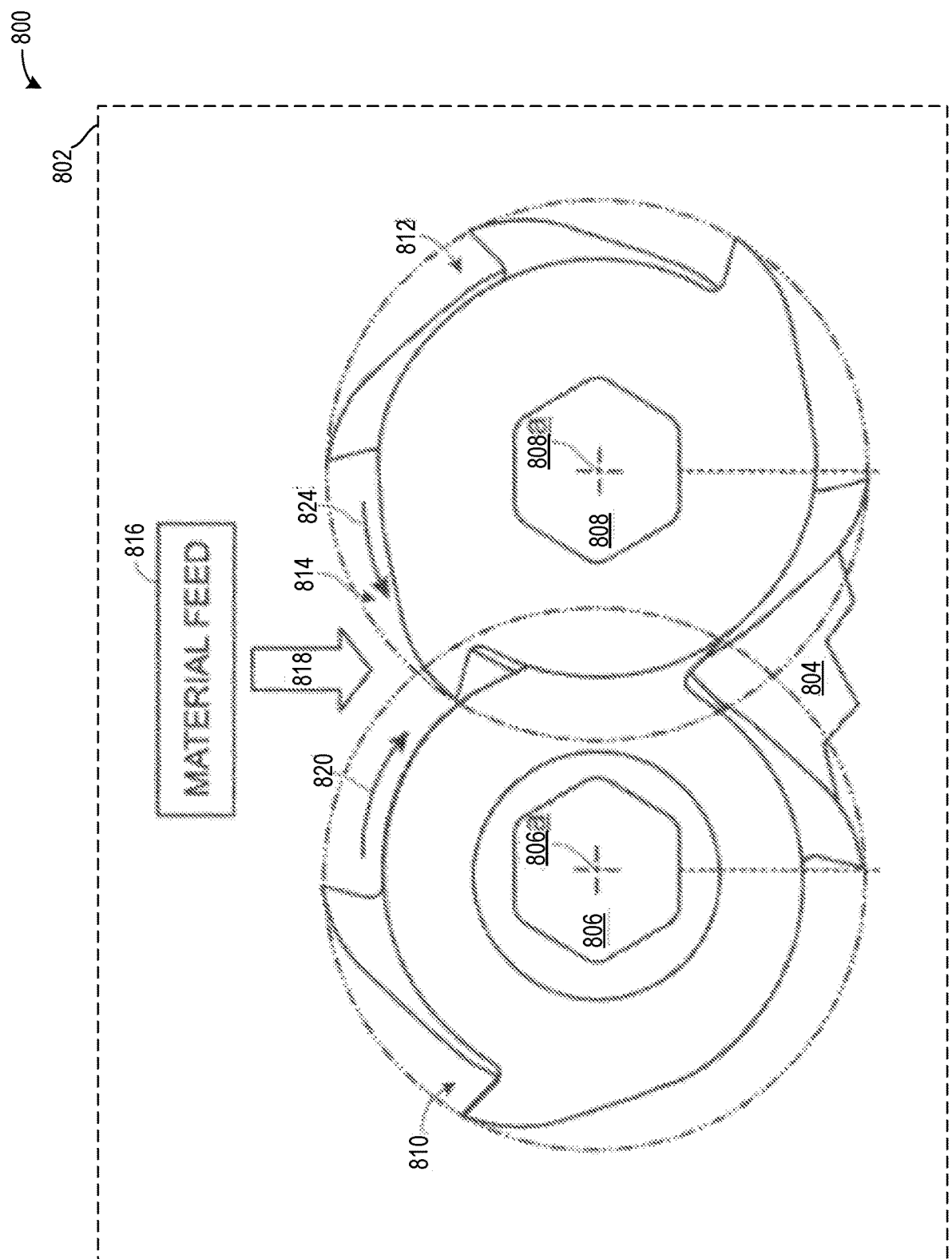
FIG. 8 illustrates a rotary shredding system within which an embodiment of a cutting blade could be used.

Turning now to FIG. 8, it shows a system 800 of a conventional two-shaft, rotary shear shredder. Shredder 802 includes a frame, a fragmentary portion of which appears at 804, and on which frame are appropriately journaled for rotation on two power driven rotary shafts, shown at 806, 808. Shafts 806, 808 are elongate and disposed in parallel, spaced, lateral adjacency in the shredder, and are specifically supported on frame 804 for rotation about their respective longitudinal axes designated 806 a, 808 a, carried in an anchored fashion, conventionally and respectively on shafts 806, 808, are essentially functionally and structurally matched sets 810, 812 of rotating cutting blades distributed along the longitudinal axis of the rotary shafts 806 and 808. In one example, each of the cutting blades 810, 812 are substantially identical to the cutting blade of FIG. 6, in that the cutting blades were produced in an oversized manner, a channel was cut proximate to the perimeter of the oversize cutting blade on a top and bottom surface of the oversized cutting blade, the channels were filled with weld and the perimeter of the oversized cutting blade was machined until the exterior wall of the channel was removed, creating an exposed sandwich of a second alloy (hardface), a first alloy and another layer of the second alloy. The rotating cutting blades 810, 812, along with their rotating carrying shafts 806, 808, respectively, collectively define a shredding zone 814 into which material which is to be shredded is fed, downwardly as is illustrated by a text-labeled block 816 and a downwardly pointing, broad arrow 818. The material feed 816 may include objects of varying size and stiffness. For example, the material feed 816 may include one or more of, but is not limited to, cars, refrigerators, tires, clothing, furniture, electrical devices, and glassware or other industrial products, where the objects may comprise one or more of metals, plastics, concrete, brick, wood, and the like. In one example, the cutting blades are arranged to counter rotate.

Two, large, overlapping, dash-double-dot circles, not specifically labeled, illustrate the paths, referred to above as the circularly overlapping sweeps, traveled by the outer extremities of the cutting blades 812, 814.

Drivingly connected, respectively, to rotating shafts 806, 808 are conventional, matched-size and capability, electric, or hydraulic, drive motors. The motors may rotate the cutting blades 810, 812 in directions parallel to the directions shown by arrows 820 and 824 respectively. That is to say, one blade may rotate counterclockwise and the other blade may rotate clockwise.

In this way, a cutting blade may have a profile with an exterior perimeter of a top surface of an angle of no more than 90° and an exterior perimeter of a bottom surface at an angle of no more than 90°, normal to top and bottom surfaces of the cutting blade. The technical effect of having the sharply angled exterior edge is to allow a greater portion of the exterior edge to contact and cut materials to be cut relative to a non-flat exterior edge, thus increasing efficiency and decreasing wear on the cutting blades.

Those skilled in the art will recognize that it is common within the art to describe devices and/or processes in the fashion set forth herein, and thereafter use standard engineering practices to integrate such described devices and/or processes into larger systems.

Embodiments of methods and systems for creating cutting blades have been described. The following claims are directed to said embodiments, but do not preempt creating cutting blades systems in the abstract. Those having skill in the art will recognize numerous other approaches to creating and re-honing cutting blades systems, precluding any possibility of preemption in the abstract. The terms used in the appended claims are defined herein in the glossary section, with the proviso that the claim terms may be used in a different manner if so defined by express recitation.

The invention claimed is:

1. A process for manufacturing a cutting blade comprising:
   cutting a main body of the cutting blade from a base material, wherein the main body is cut to form a cutting blade larger than a size of a finished cutting blade;
   machining a channel along and proximate to each of an entire perimeter of a top surface and a bottom surface of the main body of the larger cutting blade, wherein a bottom of the channel is at right angles to both walls of the channel;
   filling each of the channels with steel weld; and
   machining off the entire perimeter of the cutting blade to remove a first side of both channels, wherein the entire perimeter is machined to obtain a desired profile of the finished cutting blade.

2. The process of claim 1, further comprising drilling a plurality of tooling holes around a central bore in the main body.

3. The process of claim 2, wherein the central bore allows the finished cutting blade to be mounted on a rotating shaft of a shredding machine.

4. The process of claim 3, wherein the finished cutting blade is sized to fit in a cutting chamber at least 18"×18" in size of a shredding machine.

5. The process of claim 2, wherein the central bore allows each finished cutting blade to be respectively mounted on each of a plurality of power-driven rotary shafts of a shredding machine.

6. The process of claim 1, wherein the steel weld has a hardness of about 52 Rc to 67 Rc.

7. The process of claim 1, wherein the base material has a hardness of about 400 to about 600 HBW.

8. The process of claim 7, wherein the base material has a hardness of about 450 to about 550 HBW.

9. The process of claim 1, wherein removing the first side of the channel creates a 90° cutting edge on the cutting blade.

10. The process of claim 1, wherein each channel is no more than ½ inch from the perimeter of the main body of the larger cutting blade.

11. The process of claim 10, wherein the channel of the top surface and the channel of the bottom surface are continuous and evenly spaced and are at least ⅛ of an inch from the perimeter of the main body of the larger cutting blade.

12. The process of claim 1, wherein the main body comprises a plurality of cutting hooks, and an edge of the cutting hooks of the finished blade has a hardness of about 58 Rc to 62 Rc.

13. The process of claim 1, wherein the channel is ¾ inch deep.

* * * * *